United States Patent
Kvamme et al.

(10) Patent No.: US 6,868,889 B2
(45) Date of Patent: Mar. 22, 2005

(54) SUBSTRATE PROCESSING APPARATUS

(75) Inventors: Nathaniel J. Kvamme, Glendale, AZ (US); Ronald J. Hoffman, Phoenix, AZ (US); Cory W. Worth, Phoenix, AZ (US); Daniel G. Reed, Mesa, AZ (US)

(73) Assignee: Xyron, Inc., Scottsdale, AZ (US)

( * ) Notice: Subject to any disclaimer, the term of this patent is extended or adjusted under 35 U.S.C. 154(b) by 0 days.

(21) Appl. No.: 10/197,856

(22) Filed: Jul. 19, 2002

(65) Prior Publication Data

US 2003/0015281 A1 Jan. 23, 2003

Related U.S. Application Data

(60) Provisional application No. 60/306,432, filed on Jul. 20, 2001.

(51) Int. Cl.[7] ............................ B32B 3/20; B32B 33/00; B32B 7/10; B30B 15/00
(52) U.S. Cl. ........................ 156/579; 156/581; 156/542; 156/510; 428/40.1; 428/195.1; 428/343; 428/914
(58) Field of Search ................................ 156/540, 542, 156/579, 580, 581, 230, 247, 289, 383, 510, 538, 883; 427/146, 147; 428/40.1, 41.7, 41.8, 42.2, 195.1, 202, 343, 352, 914, 195

(56) References Cited

U.S. PATENT DOCUMENTS

| | | |
|---|---|---|
| 2,191,704 A | 2/1940 | Bennett |
| RE23,542 E | 9/1952 | Bihary |
| 2,954,069 A | 9/1960 | Lithio |
| 3,010,508 A | 11/1961 | Wilson et al. |
| 3,087,850 A | 4/1963 | Cole |
| 3,287,192 A | 11/1966 | Pohlenz |
| 3,343,978 A | 9/1967 | Engelbach |
| 3,901,758 A | 8/1975 | Humphries |

(List continued on next page.)

FOREIGN PATENT DOCUMENTS

| | | | |
|---|---|---|---|
| EP | 0 264 270 | 4/1988 | |
| EP | 0 275 670 | 7/1988 | |
| NL | 1003698 C | 2/1998 | |
| NL | 1003698 | * 2/1998 | ........... B29C/47/04 |
| WO | 94/23957 | 10/1994 | |
| WO | WO98/14393 | 4/1998 | |
| WO | WO 01/28763 A1 | 4/2001 | |

OTHER PUBLICATIONS

International Search Report, PCT/US 00/41300, Mar. 27, 2001, pp. 1–2, Annex.

*Primary Examiner*—J. A. Lorengo
(74) *Attorney, Agent, or Firm*—Pillsbury Winthrop LLP

(57) ABSTRACT

A substrate processing apparatus includes a frame, first and second supply rolls and a substrate processing assembly including a resiliently deformable structure configured to apply pressure to the first and second supply rolls to perform a substrate processing operation. A method for processing a substrate includes providing first and second supply rolls rotatably mounted to the substrate processing apparatus, wherein at least one of the first and second supply rolls has pressure-sensitive adhesive provided thereon. The selected substrate is enabled to be fed in a substrate receiving opening with the first and the second substrates positioned on opposing sides thereof. The first and second substrates are advanced through the substrate receiving opening. A resiliently deformable structure deforms to apply pressure to the selected substrate and the first and second substrates as they are advanced through the substrate receiving opening, thereby bonding the adhesive to the selected substrate.

18 Claims, 4 Drawing Sheets

U.S. PATENT DOCUMENTS

| | | |
|---|---|---|
| 3,943,031 A | 3/1976 | Krueger et al. |
| 3,949,935 A | 4/1976 | Stackig |
| 4,001,073 A | 1/1977 | Jones et al. |
| 4,021,288 A | 5/1977 | Hannon et al. |
| 4,094,719 A | 6/1978 | Jones et al. |
| 4,193,342 A | 3/1980 | Held |
| 4,201,613 A | 5/1980 | Olivieri et al. |
| 4,285,999 A | 8/1981 | Olivieri et al. |
| 4,353,776 A | 10/1982 | Giulie et al. |
| 4,391,539 A | 7/1983 | Connoy |
| 4,419,175 A | 12/1983 | Bradshaw et al. |
| 4,531,690 A | 7/1985 | Condy |
| 4,541,889 A | 9/1985 | Held |
| 4,643,789 A | 2/1987 | Parker et al. |
| 4,650,533 A | 3/1987 | Parker et al. |
| 4,718,971 A | 1/1988 | Summers |
| 4,728,380 A | 3/1988 | Jones et al. |
| 4,859,274 A | 8/1989 | Marvel |
| 4,859,512 A | 8/1989 | Jones et al. |
| 4,891,090 A | 1/1990 | Lorincz et al. |
| 4,950,517 A | 8/1990 | Loggins |
| 4,966,639 A | 10/1990 | Pfeffer et al. |
| 5,288,358 A | 2/1994 | Logan |
| 5,316,613 A | 5/1994 | Samuelson et al. |
| 5,383,996 A | 1/1995 | Dressler |
| 5,429,850 A | 7/1995 | Held |
| 5,441,785 A | 8/1995 | Liebe, Jr. |
| 5,445,696 A | 8/1995 | Krawczyk |
| 5,445,703 A | 8/1995 | Steeves et al. |
| 5,580,417 A | 12/1996 | Bradshaw |
| 5,584,962 A | 12/1996 | Bradshaw et al. |
| 5,605,730 A | 2/1997 | Treleaven |
| 5,788,796 A | 8/1998 | Look et al. |
| 5,788,806 A | 8/1998 | Bradshaw et al. |
| 5,795,735 A | 8/1998 | Lockerbie |
| 5,855,722 A | 1/1999 | Osaka |
| 5,902,440 A | 5/1999 | Jenkins |
| 5,961,779 A | 10/1999 | Bradshaw |
| 6,244,322 B1 | 6/2001 | Paque |
| 6,270,612 B1 | 8/2001 | Bradshaw |
| D451,959 S | 12/2001 | Velasquez |
| D459,396 S | 6/2002 | Velasquez et al. |
| 6,576,080 B1 * | 6/2003 | Velasquez et al. .......... 156/298 |
| 2002/0053398 A1 | 5/2002 | Miller |
| 2002/0059980 A1 | 5/2002 | Lemens et al. |

* cited by examiner

SUBSTRATE PROCESSING APPARATUS

This application claims priority from U.S. Provisional Application of KVAMME et al., U.S. Provisional Application No. 60/306,432, filed Sep. 20, 2001 the entirety of which is hereby incorporated by reference.

BACKGROUND OF THE INVENTION

1. Field of the Invention

The present invention relates to a substrate processing apparatus for performing a processing operation on a selected substrate.

2. Description of Related Art

Substrate or master processing apparatuses, such as laminating apparatuses and adhesive transfer apparatuses, are well-known in the art. These apparatuses typically include a frame to which a pair of feed rolls are mounted (either individually or in a cartridge). A substrate processing assembly is provided in the frame and the stock materials on the feed roll are unwound and fed into the processing assembly. A power or hand-operated actuator actuates the processing assembly. A substrate or master (such as a photograph, printout, business card or any other selected substrate or document) to be processed is fed into the processing assembly and the processing assembly causes adhesive from one or both of the stock materials to bond to the substrate. In laminating operations, both stock materials are laminating films coated with pressure-sensitive or heat-sensitive adhesive and these films are both adhered to the opposing sides of the substrate. In adhesive transfer operations, one of the stock materials is a release liner on which a layer of adhesive is coated and the other is an aggressive or non-aggressive mask. During the operation, the adhesive on the release liner is transferred to one side of the substrate and, if the mask substrate is aggressive, i.e. has an affinity for adhesive bonding, then any excess adhesive will transfer to the mask substrate, which is then peeled off to expose the substrate on the release liner and remove the excess adhesive. For further details on these operations, reference may be made to U.S. Pat. Nos. 5,580,417 and 5,584,962, the entire contents of which are herein incorporated by reference.

In some substrate processing apparatuses, a pair of nip rollers is used to apply the pressure required to perform a substrate processing operation. More specifically, such apparatuses are designed to apply pressure with their nip rollers to adhere pressure-sensitive adhesive from one or both of the stock materials to the selected substrate being processed. The use of nip rollers in these types of apparatuses is well-known for applying the requisite pressure to bond the pressure-sensitive adhesive of one or both of the stock materials to the substrate being processed. However, the nip rollers represent a significant amount of both the cost and weight of the device. Further, the nip rollers add to the overall size and manufacturing complexity of the device. The nip rollers must be pressed together with the correct amount of force and also must be properly aligned to ensure a smooth, efficient processing operation.

While such types of apparatuses are quite suitable for their intended purposes, the costs associated with their manufacture can make their purchase undesirable for casual users who do not frequently use these devices to perform processing operations. To meet the needs of the casual user, it would be desirable to reduce some of the component and manufacturing costs associated with these conventional apparatuses.

SUMMARY OF THE INVENTION

It is one aspect of the present invention to provide a substrate processing apparatus for processing a selected substrate. The substrate processing apparatus includes a frame and first and second supply rolls rotatably mounted to the frame. The first supply roll includes a first supply substrate and the second supply roll includes a second substrate. At least one of the first and second supply rolls has pressure-sensitive adhesive provided thereon. A substrate processing assembly includes a substrate receiving opening and a resiliently deformable structure fixed in the opening. The deformable structure may be permanently or removably fixed. The substrate receiving opening enables the selected substrate to be fed therein with the first and the second substrates positioned on opposing sides thereof. The resiliently deformable structure deforms to apply pressure to the selected substrate and the first and second substrates as they are advanced through the substrate receiving opening, thereby bonding the adhesive to the selected substrate.

The substrate processing apparatus according to the invention may further include a cartridge assembly having the substrate processing assembly removably coupled thereto. Alternatively, the substrate processing apparatus according to the invention may further include a cartridge assembly having the substrate processing assembly fixedly coupled thereto.

By using the substrate processing assembly to press the supply substrates against the selected substrate to affect adhesive bonding, the component and manufacturing costs associated with nip rollers are eliminated, thereby reducing the overall cost of the apparatus. Also, the weight and overall size of the processing apparatus may be reduced, if desired, by the elimination of the nip rollers.

It is another aspect of the present invention to provide a method of processing a selected substrate using a substrate processing apparatus. The method comprises providing first and second supply rolls rotatably mounted to the substrate processing apparatus, wherein the first supply roll includes a first supply substrate and the second supply roll includes a second substrate and wherein at least one of the first and second supply rolls has pressure-sensitive adhesive provided thereon. The selected substrate is then enabled to be fed in a substrate receiving opening with the first and the second substrates positioned on opposing sides thereof. The first and second substrates are advanced through the substrate receiving opening. A resiliently deformable structure deforms to apply pressure to the selected substrate and the first and second substrates as they are advanced through the substrate receiving opening, thereby bonding the adhesive to the selected substrate.

Other objects, features, and advantages will become apparent from the following detailed description, the accompanying drawings, and the appended claims.

DETAILED DESCRIPTION OF THE INVENTION

Figure 1:
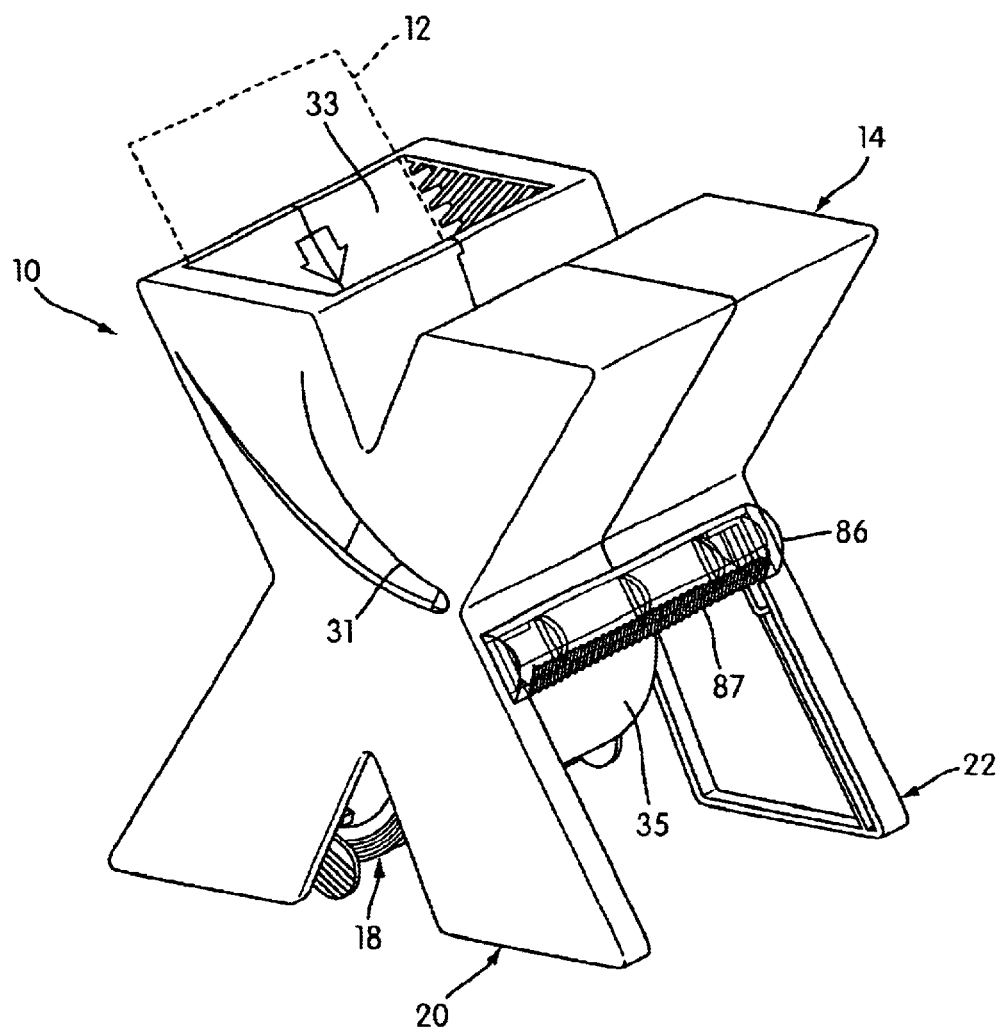
FIG. 1 is a perspective view of a substrate processing apparatus constructed in accordance with the principles of the present invention.
Figure 2:
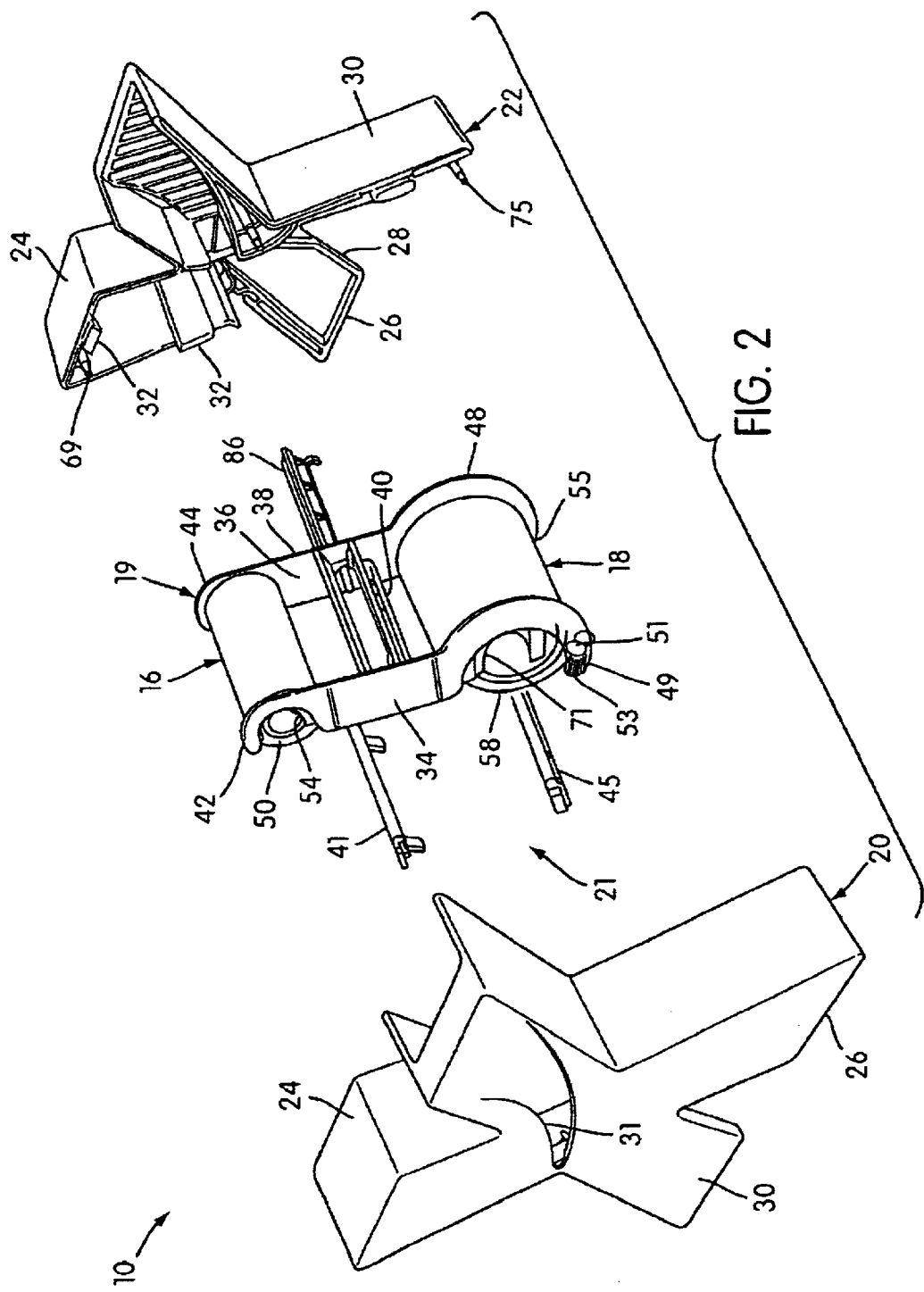
FIG. 2 is an exploded view of the substrate processing apparatus shown in FIG. 1.

FIGS. 1 and 2 show a substrate processing apparatus, generally indicated at 10, for performing a processing operation on a selected substrate 12. The selected substrate 12 may be any type of substrate desired to be processed, including but not limited to photographs, business cards, label stock, price tags, magazine cut-outs, name tags, etc. The apparatus 10 may be of any suitable size. The apparatus 10 illustrated may be of a hand-held size that can be manually grasped and handled in one hand.

The apparatus 10 includes a frame 14, a first supply roll 16, a second supply roll 18, a cartridge assembly 19, and a substrate processing assembly 21. As illustrated, the frame 14 includes two frame halves 20, 22 constructed of plastic molded into an X-shape and of generally mirror image construction. The X-shape is not functional per se and is considered a trade dress right of the assignee, Xyron, Inc. The frame halves 20, 22 may be different shapes and need not be of mirror image construction. In a preferred embodiment, the halves 20, 22 are substantially similar to one another in structure and operation, as will be fully appreciated in the below description.

As best seen in FIGS. 1 and 2, each frame half 20, 22 has a top wall 24, a bottom wall 26, an inwardly extending wall 28 and an outwardly facing side wall 30. The bottom wall 26 has a substantially flat configuration and may engage a support surface, such as a desk or table, when the apparatus 10 is placed on the support surface. The outwardly facing side walls 30 may include a window, or some other substantially transparent region, that can be used to determine the type of first supply substrate being used on the one or both of supply rolls 16, 18, or the amount remaining.

The inwardly extending walls 28 of the frame halves 20, 22 can be secured to one another, for example, by press-fit or snap fit. Securing structure in the form of flanges 32 and flange receiving structure (not shown) may be provided on the inwardly facing walls 28 of each frame half 20, 22 to effect the snap fit of the halves 20, 22 to one another. For example, the flanges 32 may be provided by one frame half 20 or 22 and the flange receiving structure may be provided by the other frame half 20 or 22 so that each flange 32 on the one frame half 20 or 22 would cooperate with the flange receiving structure provided by the other frame half 20 or 22.

Alternatively, one or more flanges 32 and flange receiving structure could be provided on each frame half 20, 22 so that each flange 32 on the half 20 would cooperate with flange receiving structure provided by the half 22, for example, and vice versa. Other securing means, such as an adhesive, bonding material or heat staking, may be used to secure the two halves 20, 22 of the frame 14 together.

Although not shown, it should be appreciated that the frame 14 may be formed from a single piece of plastic with at least one living hinge. The frame would be folded about the at least one living hinge and heat-staked, glued, snap fit or otherwise fixed together for security. The broad principles of the present invention, however, are not limited to the use of a frame 14 made from two plastic halves. The principles of the present invention may be practiced in a frame made of metal, for example, or a foldable frame could be used for cost savings purposes, for example.

As shown in FIG. 1, a portion of the frame 14 defines a feed side opening 33. The selected substrate 12 may be pushed through the feed side opening 33 and between the supply rolls 16, 18 to emerge from a discharge opening 35 defined by the front portion of the frame 14, with supply substrates 52, 60 affixed thereto. The supply substrates 52, 60 are provided by the supply rolls 16, 18. While the selected substrate 12 is disposed between the supply rolls 16, 18, the pressing force provided by the substrate processing assembly 21 acts thereon and on the supply substrates 52, 60 to effect the desired processing operation, as will be described in greater detail below.

Figure 3:
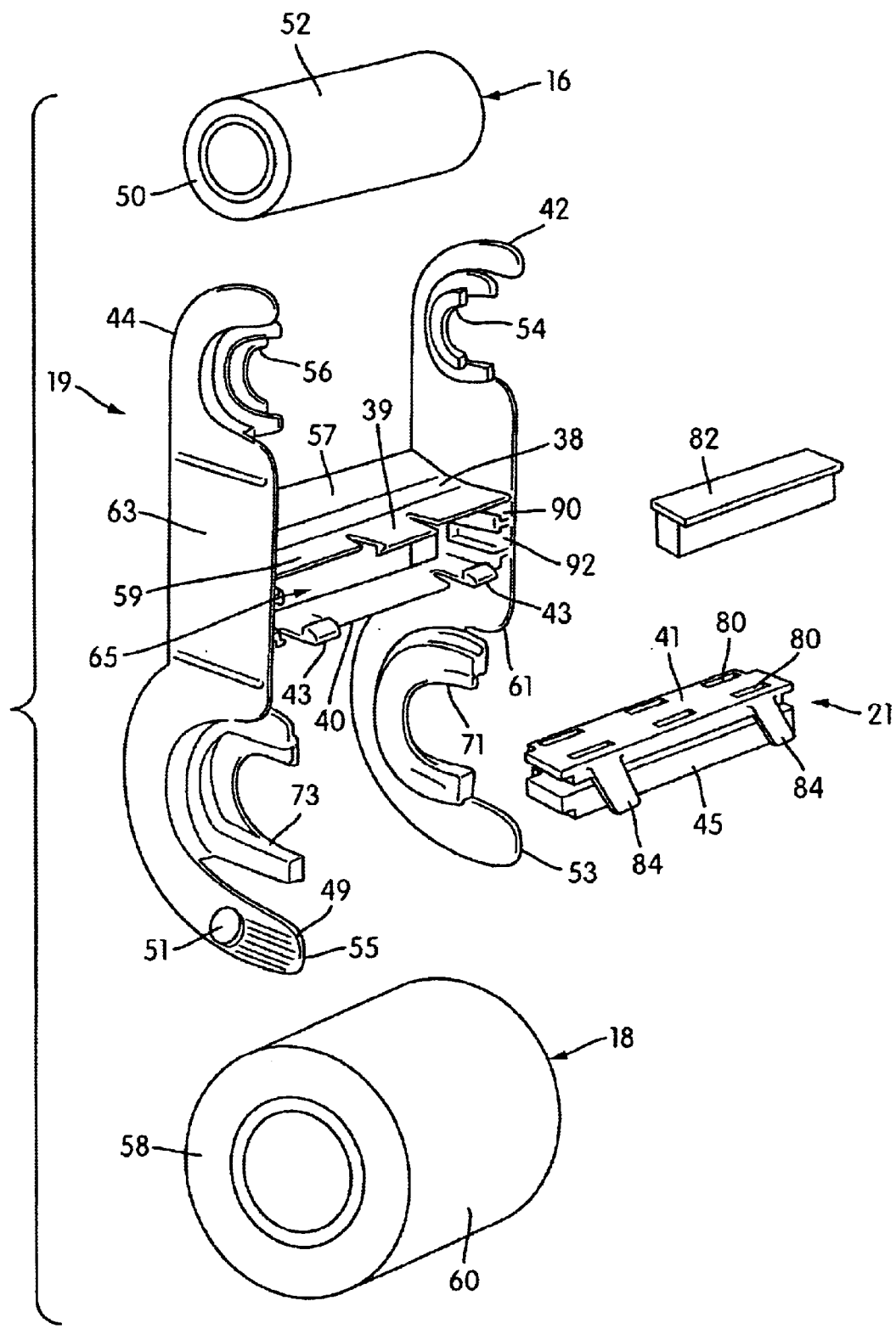
FIG. 3 is an exploded view of a cartridge assembly of the substrate processing apparatus shown in FIG. 1.

The cartridge assembly 19, as best seen in FIGS. 2 and 3, is constructed from a sufficiently resilient material, such as plastic, and is received between the frame halves 20, 22 when the frame halves 20, 22 are secured together to form the frame 14. The cartridge assembly 19 can be of one-piece construction. The cartridge assembly 19 includes cooperating sidewalls 34, 36 (FIGS. 2 and 3) that define a pair of first supply roll supports 42, 44 (FIG. 3) and a pair of second supply roll supports 46, 48 (FIG. 3), respectively. The first supply roll supports 42, 44 have a generally arcuate configuration and are positioned on opposite sides of the first supply roll 16 to releaseably receive the first supply roll 16 therebetween. The second supply roll supports 46, 48 have a generally arcuate configuration and are positioned on opposite sides of the second supply roll 18 to releaseably receive the second supply roll 18 therebetween. The supply rolls 16, 18 need not be removably received in the cartridge, and instead may be fixed thereon.

The second supply roll supports 46, 48 each have a manually engageable portion 49 (only one shown in FIGS. 2 and 3), which may be ribbed for better gripping, provided on a free end 53, 55 thereof. An outwardly extending tab 51 (only one shown in FIGS. 2 and 3) is also provided on the free ends 53, 55 of the supports 46, 48, adjacent to the respective manually engageable portion 49. The tabs 51 are configured to engage recesses on the inwardly facing walls 28 of each frame half 20, 22 to secure the cartridge assembly 19 within the frame 14.

The cartridge assembly 19 also includes an upper member or ceiling 38 and a lower member or deck 40 that each extend between the sidewalls 34, 36 to space the sidewalls 34, 36 from one another. The ceiling 38 has a flange 39 extending therefrom which is configured to secure an upper portion 41 of the substrate processing assembly 21 adjacent the ceiling 38. The deck 40 has a pair of flanges 43 extending therefrom which are configured to secure a lower portion 45 of the substrate processing assembly 21 adjacent the deck 40.

The ceiling 38 is angled upwardly toward the feed opening 33 and is configured to slidingly receive the first supply substrate 52 as the first supply substrate 52 is fed over its rearward most surface 57 (FIG. 3). The ceiling 38 has a lower portion 59 and the deck 40 has a lower portion 61 that is spaced from the upper portion 59 of the ceiling 38 to generally define a supply substrate opening 65. The supply substrate opening 65 receives the substrate processing assembly 21 to advance the first and second supply substrates 52, 60 therethrough, as will be described in greater detail below.

The first supply roll 16 comprises a core 50 and a first supply substrate 52 wound on the core 50. The first supply substrate 52 may be polypropylene or polyesther, for example. The supply roll supports 42, 44 of the cartridge assembly 19 are received inside the frame 14 adjacent the top wall 30 and the frame halves 20, 22 on opposite sides of the first supply roll 16. Each of the supports 42, 44 has a semi-circular structure 54, 56, respectively, and the opposing ends of the core 50 are positioned over the semi-circular structures 54, 56 to hold and support the first supply roll 16 therebetween. The frame 14 may have pins 69 or other structure to support the semi-circular structures 54, 56 and the core 50 when the cartridge assembly 19 is positioned in the frame 14. The supply roll supports 42, 44 constitute a first supply roll support structure.

The second supply roll 18 comprises a core 58 and a second supply substrate 60 wound about the core 58. The second supply roll supports 46, 48 are received within the frame 14 between the frame halves 20, 22 with the laterally outer surfaces of the supports 46, 48 engaging the inwardly facing walls 28 of the frame halves 20, 22, respectively. Each of the supports 46, 48 has a semi-circular structure 71, 73, respectively, and the opposing ends of the core 58 are positioned over these structures 71, 73 to hold and support the second supply roll 18 therebetween. The frame 14 may have pins 75 or other structure to support the semi-circular structures 71, 73 and the core 58 when the cartridge assembly 19 is positioned in the frame 14. The supply roll supports 46, 48 constitute a second supply roll support structure.

The cooperating sidewalls 34, 36 are constructed such that a user may move the manually engageable portions 49, for example by squeezing the manually engageable portions 49 of the supports 46, 48 toward one another, to remove the first supply roll 16 from the cartridge assembly 19. As the manually engageable portions 49 are moved toward one another, the cooperating sidewalls 34, 36 are sufficiently resilient to deflect away from one another such that the supports 42, 44 move away from one another and disengage the core 50 of the first supply roll 16. When the user releases the manually engageable portions 49, the sidewalls 34, 36 and the supports 42, 44 return to their initial position where the semi-circular structures 54, 56 of the supports 42, 44 can engage the core 50 of the first supply roll 16, if the supply roll 16 is positioned therebetween.

The cartridge assembly 19 is illustrated in FIG. 3 in greater detail. The cartridge assembly 19 positions the supply rolls 16, 18 to be parallel and spaced from one another and the supply rolls 16, 18 are retained in this orientation by the supply roll supports 42, 44 and 46, 48, respectively. The positioning of the second supply roll 18 relative to the first supply roll 16 allows the free end of the supply substrates 52, 60 to be fed into the substrate processing assembly 21. The substrate processing assembly 21 is configured to press the supply substrates 52, 60 into engagement with one another, in a generally vertical pressing direction so that adequate pressure for adhesive bonding is created. In the illustrated embodiment, the pressing direction is generally vertical, however it is contemplated that the pressing direction may be other than vertical.

Figure 4:
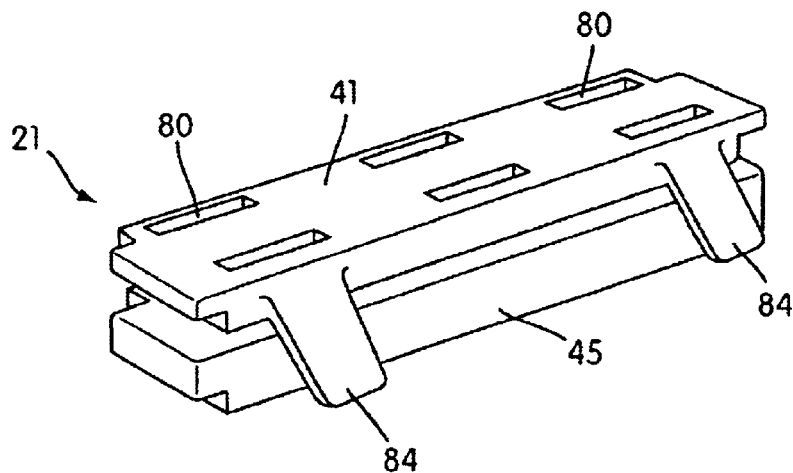
FIG. 4 is a perspective view of a substrate processing assembly of the substrate processing apparatus shown in FIG. 1.

As best seen in FIG. 4, the substrate processing assembly 21 includes the spaced apart upper and lower portions 41, 45, respectively, which are positioned in the supply substrate opening 65 to receive the supply substrates 52, 60 therethrough. For example, the upper portion 41 engages the first supply substrate 52 and the lower portion 45 engages the second supply substrate 60. Grooves 90, 92 are formed in the sidewalls 36, 38 of the cartridge assembly 19, as shown in FIG. 3. The grooves 90, 92 are configured to receive the upper and lower portions 41, 45 of the substrate processing assembly 21 in desired spaced relation and the upper and lower portions 41, 45 are secured in the cartridge assembly 19 by the flanges 39, 43 provided on the ceiling 38 and deck 40, respectively. The upper and lower portions 41, 45 are configured to keep the supply substrates 52, 60 pressed together as the diameters of the supply rolls 16, 18 are reduced due to depletion of the supply substrates 52, 60.

Referring to FIG. 4, the upper portion 41 of the substrate processing assembly 21 is in the form of an elongated clip that has a plurality of longitudinally extending slots 80 formed therein. The slots 80 are configured to receive weather-stripping 82 therethrough so to keep the supply substrates 52, 60 pressed together. The slots 80 could be configured to receive any resiliently deformable material, e.g. (felt, rubber, a resilient plastic beam, a spring biased plastic beam, a sponge-like material, one or more resilient wipers, etc.), that can be oriented between two pressure applying surfaces to adhere the supply substrates 52, 60 to one another. A pair of spaced, deflecting members 84 are provided on the upper clip 41 to direct the substrate 12 downwardly away from a cutting blade 86 disposed in the discharge opening 35. This allows a user to grab and manually pull the free ends of the supply substrates 52, 60 extending out of the discharge opening 35. The cutting bar 86 may include a blade 87, for example a serrated blade, a non-serrated blade or any other type of blade.

The use of a resiliently deformable structure is preferred because it enables the device to be used effectively with substrates of varying thicknesses than if the structure were fixed and rigid.

Each of the supply substrates 52, 60 has a first surface and a second surface opposite the first surface. These supply substrates 52, 60 are wound about their respective cores 50, 58. At least the first supply substrate 52 is coated with a layer of pressure-sensitive adhesive.

For a normal laminating operation, both the supply substrates 52, 60 are transparent films and the second supply substrate 60 is also coated with a pressure-sensitive adhesive and its opposite surface treated with a release material, such as silicone or wax. The second surface of the first supply substrate 52 also has the surface opposite the adhesive coated with a release material. Like the first supply roll 16, the adhesive on the second supply substrate's first surface faces radially outwardly. The release material on the supply substrates 52, 60 prevents that adhesive from bonding thereto while wound on the supply rolls 16, 18. Instead of coating the second surfaces with release material, a release liner could be wound up with both of the supply substrates 52, 60 to prevent the adhesive on the first surface of each substrate 52, 60 from sticking to the second surface.

For a normal adhesive transfer operation, the first supply substrate 40 would be a differential release liner coated with release material on both its first and second surfaces. The release material on the second surface will prevent the adhesive from bonding thereto and the release material on the first surface will allow the pressure-sensitive adhesive thereon to transfer to the selected substrate without remaining bonded to the first surface. The second supply substrate 60 is a mask substrate that carries no adhesive. The first surface of the mask substrate may be left untreated or, alternatively, it may be treated with a release material to prevent adherence of the adhesive on the first supply substrate 52 thereto. The role of the mask substrate will be explained hereinbelow with respect to the operation of the substrate processing apparatus 10.

For a combination laminating/adhesive transfer operation, the first supply substrate 52 is a differential release liner as described above for a normal adhesive transfer operation. The second supply substrate 60, however, is a transparent film having its first surface coated with a pressure-sensitive adhesive and its second surface coated with a release material as described above for a normal laminating operation. In a combination laminating/adhesive transfer operation, the second supply substrate 60 (the transparent film) is adhered to one surface of the selected substrate, and the pressure sensitive adhesive on the first supply substrate 52 (the release liner) is adhered to the other surface of the selected substrate 12. The supply substrates 52, 60 are trimmed around the periphery of the selected substrate 12 and the release liner is peeled back to expose the adhesive, thus providing a selected substrate 12 that is adherable like a label, but protected on one side by a laminating film.

For a magnet making operation, the first supply substrate 52 is made from a magnetized material, as in U.S. application of Neuburger, Ser. No. 09/827,943, filed Apr. 9, 2001, the entirety of which is hereby incorporated into the present application by reference. The second supply substrate 60 is a mask substrate as discussed above with respect to the normal adhesive transfer operation. Alternatively, the second supply substrate 60 could be a laminate to create an item which is protected on its top surface and is magnetic on its back surface, for example.

The substrate processing apparatus 10 is configured such that, as the supply substrates 52, 60 are unwound from the supply rolls 16, 18 during, for example, a laminating process, the supply rolls 16, 18 are simultaneously unwound through the substrate processing assembly 21. The ceiling 38 and the deck 40 maintain an operative pressing force (in the pressing direction) between one another. Therefore, the ceiling 38 and the deck 40 apply an adequate pressing force to the supply stock and selected substrate 12 when an operation is performed, as will be described below in further detail.

Operation

Figure 5:
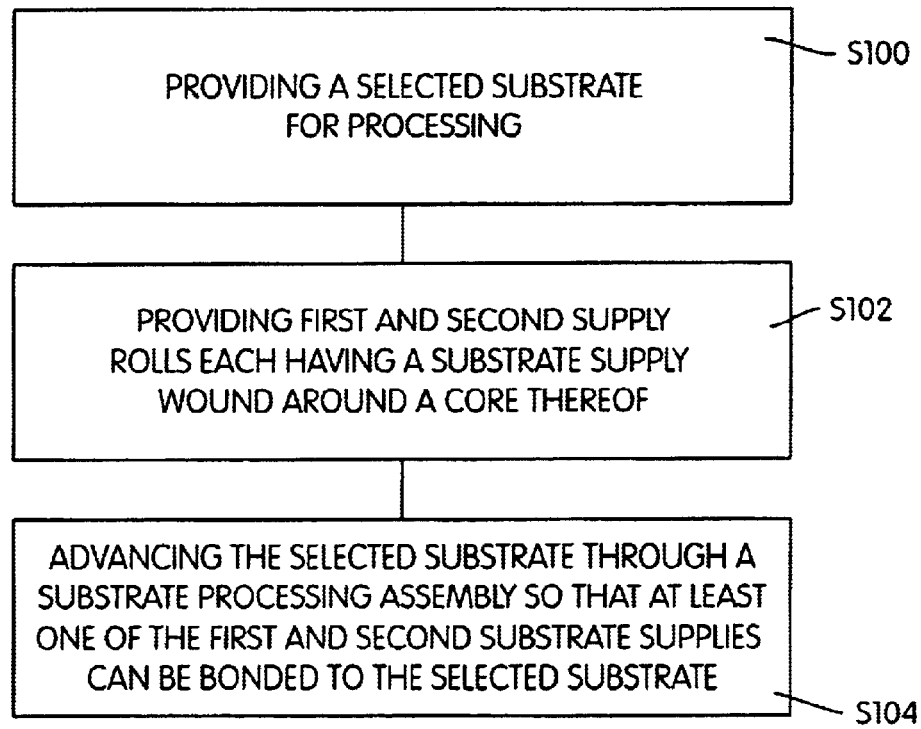
FIG. 5 is a block diagram showing a method of utilizing the substrate processing apparatus shown in FIG. 1 in accordance with the principles of the present invention.

Referring to FIG. 5, a method of processing a selected substrate according to the present invention is illustrated. To process a selected substrate, irrespective of what type of processing operation is being performed, a selected substrate 12 is provided at S100. First and second supply rolls 16 and 18 each having a supply substrate 52, 60 wound around a core are provided at S102. For example, the first and second supply rolls 16, 18 may be used once and then replaced, or alternatively, the first and second supply rolls 16, 18 may be refillable and reusable. At S104, the selected substrate is advanced through the substrate processing assembly 21 so that the first and second supply substrates 52, 60 can be bonded to the selected substrate.

The user inserts the first supply roll 16 into the cartridge assembly 19 by manually pressing the engageable portions 49 on the free ends 53, 55 toward one another, by squeezing them together, for example, so that a user may remove a first supply roll 16 from between the supports 42, 44 or may insert a first supply roll 16 between the supports 42, 44. When the engageable portions 49 on the free ends 53, 55 are released, they move away from one another until they reach their initial positions in which they each bias the semi-circular structures 54, 56 into engagement with the first supply roll core 50. The biasing force is provided by the sidewalls 36, 38 along with the supports 42, 44 and the semi-circular structures 54, 56 and may be used to sufficiently tension the first supply roll 16. The second roll 18 is removed from or inserted into the cartridge assembly 19 in a substantially identical manner as the first supply roll 16, except that the user would move the supports 46, 48 away from one another, for example, by squeezing the free ends of the supports 42, 44.

The selected substrate 12 is inserted into the feed side opening 33 and then the lead end thereof can be fed between the supply rolls 16, 18. The user then manually advances the selected substrate 12 between the supply rolls 16, 18 so that the pressed engagement of the substrate processing assembly 21 presses first surfaces of both supply substrates 52, 60 against the opposing sides of the selected substrate 12 so as to affect adhesive bonding between the substrates 12, 52, and/or 60. As the selected substrate 12 is advanced between the supply rolls 16, 18, the portions of the first and second supply substrates 52, 60 unwind from their respective supply rolls 16, 18 and advance together with the selected substrate 12 out through the discharge side opening 35.

Advancement of the selected substrate 12 may be effected by manually pulling on the free ends of the first and second supply substrates 52, 60 extending out the discharge side opening 64. Alternatively, for an apparatus particularly designed for normal adhesive transfer or magnet making, a take-up roll (not shown) driven by a knob or actuator may be utilized to wind up the second supply substrate 60 as shown in U.S. application Ser. No. 09/564,587, filed May 5, 2000 the entirety of which is hereby incorporated into the present application by reference.

For a normal laminating operation, the discharged product is the selected substrate 12 with laminating films adhered to the opposing sides thereof. If desired, the films may be trimmed around the periphery of the selected substrate 12.

For a normal adhesive transfer operation, the discharged product is the selected substrate 12 with the pressure-sensitive adhesive from the release liner bonded to one side thereof and the release liner covering the bonded adhesive. The mask substrate covers the other side of the selected substrate 12 and any portions of the release liner and adhesive exposed around the periphery of the selected substrate 12. If the first surface of the mask substrate is treated with a release material, then it will simply serve to cover the excess adhesive around the periphery of the selected substrate 12 until such time as the user desires to peel back the mask substrate and remove the selected substrate 12 from the release liner for adherence to a contact surface. However, the first surface of the mask substrate may remain untreated and thus have an affinity for bonding with the excess adhesive exposed around the periphery of the selected substrate 12. The mask substrate will then bond with this excess adhesive during the processing operation. As a result, peeling back the mask substrate from the release liner and selected substrate 12 will strip away the excess adhesive prior to peeling the selected substrate 12 from the release liner.

For a combination laminating/adhesive transfer operation, the discharged product is the selected substrate 12 with (a) the pressure-sensitive adhesive from the release liner bonded to one side thereof and the release liner covering the bonded adhesive and (b) a laminating film covering and protecting the other side of the selected substrate 12. The selected substrate 12 can be trimmed around its periphery, if desired, and the release liner can be peeled back to enable the selected substrate 12 to be adhered to a contact surface as desired with the laminating film protecting the opposite side.

For a magnet substrate, the discharged product is the magnet substrate bonded to one side of the selected substrate 12 and the mask substrate covering both the other side of the selected substrate 12 and any portions of the magnet substrate and adhesive exposed around the periphery of the selected substrate 12. If the first surface of the mask substrate is treated with a release material, then it will simply serve to cover the excess adhesive around the selected substrate 12 so as to enable the user to trim the magnet substrate around the periphery of the selected substrate 12 with the mask substrate covering that excess adhesive. Alternatively, the mask substrate could be substituted with a laminate, thereby producing a discharged product which is protected on its top surface and is magnetic on its back surface, for example.

The first surface of the mask substrate may remain untreated and thus have an affinity for bonding with the excess adhesive exposed around the periphery of the selected substrate 12. As a result, peeling back the mask substrate from the magnet substrate and the selected substrate 12 will strip away the excess adhesive prior to trimming the magnet substrate to the periphery of the selected substrate 12.

While the principles of the invention have been made clear in the illustrative embodiments set forth above, it will be obvious to those skilled in the art to make various modifications to the structure, arrangement, proportion, elements, materials, and components used in the practice of the invention.

For example, the frame could receive the supply rolls 16, 18 individually instead of using the cartridge assembly 19.

Although the illustrated cartridge assembly 19 positions the supply rolls 16, 18 with respect to one another, any suitable structure may be used to position the supply rolls 16, 18 with respect to one another so that the supply substrates 52, 60 are maintained in pressed engagement with one another by the substrate processing assembly 21. For example, each half 20, 22 of the frame may be configured to receive the supply rolls 16, 18, such that the supply rolls 16, 18 are rotatably mounted within the frame 14 without implementation of a cartridge assembly, such as cartridge assembly 19. That way, the substrate processing apparatus 10 can be disposable.

It will thus be seen that the objects of this invention have been fully and effectively accomplished. It will be realized, however, that the foregoing exemplary embodiments have been shown and described for the purpose of illustrating the functional and structural principles of this invention and are subject to change without departure from such principles.

What we claim is:

1. A hand-held substrate processing apparatus for processing a selected substrate comprising:
   a frame of hand-held size configured to be received in one hand of a user;
   first and second supply rolls rotatably mounted to the frame, the first supply roll including a first supply substrate and the second supply roll including a second supply substrate, at least one of the first and second supply rolls having pressure-sensitive adhesive provided thereon; and
   a substrate processing assembly devoid of rotatable nip rollers, the substrate processing assembly including a substrate receiving opening and a resiliently deformable structure fixed in the opening, the substrate receiving opening enabling the selected substrate to be fed therein with the first and the second supply substrates positioned on opposing sides thereof, the resiliently deformable structure deforming to apply pressure to the selected substrate and the first and second supply substrates as they are advanced through the substrate receiving opening, thereby bonding the adhesive to the selected substrate;
   wherein the hand-held size of the frame enables a processing operation to be performed by inserting a leading edge portion of the selected substrate between the first and second supply substrates and thereafter grasping the frame with one hand and pulling lead end portions of the first and second supply substrates with the other hand so as to advance the first and second supply substrates and the selected substrate through the substrate processing assembly for application of pressure by the resiliently deformable structure.

2. A hand-held substrate processing apparatus according to claim 1, further comprising a cartridge assembly removably mountable in the frame, the cartridge assembly being configured to support the substrate processing assembly therein.

3. A hand-held substrate processing apparatus according to claim 1, further comprising a cartridge assembly mounted in the frame.

4. A hand-held substrate processing apparatus according to claim 1, wherein the first and second supply rolls are individually rotatably mounted in the frame.

5. A hand-held substrate processing apparatus according to claim 1, wherein the first and second supply rolls are removably rotatably mounted in the frame.

6. A hand-held substrate processing apparatus according to claim 1, wherein the first supply substrate is a release liner and wherein the second supply substrate is a transparent laminating film having a layer of adhesive disposed on the first surface thereof for use in a combination laminating/adhesive transfer operation.

7. A hand-held substrate processing apparatus according to claim 1, wherein the first supply substrate is a flexible magnet substrate and wherein the second supply substrate is a mask substrate devoid of adhesive while wound on the second supply roll for use in a magnet making operation.

8. A hand-held substrate processing apparatus according to claim 1, wherein the first supply substrate is a release liner and wherein the second supply substrate is a laminating film devoid of adhesive for use in an adhesive transfer operation.

9. A hand-held substrate processing apparatus according to claim 1, wherein the first and second supply substrates are transparent laminating films for use in a laminating operation.

10. A hand-held substrate processing apparatus for processing a selected substrate comprising:
    a frame of hand-held size configured to be received in one hand of a user;
    a cartridge assembly mountable to the frame;
    first and second supply rolls rotatably mounted to the cartridge assembly, the first supply roll including a first supply substrate and the second supply roll including a second supply substrate, at least one of the first and second supply rolls having pressure-sensitive adhesive provided thereon; and
    a substrate processing assembly devoid of rotatable nip rollers, the substrate processing assembly including a substrate receiving opening and a resiliently deformable structure fixed in the opening, the substrate receiving opening enabling the selected substrate to be fed therein with the first and the second supply substrates positioned on opposing sides thereof, the resiliently deformable structure deforming to apply pressure to the selected substrate and the first and second supply substrates as they are advanced through the substrate receiving opening, thereby bonding the adhesive to the selected substrate;
    wherein the hand-held size of the frame enables a processing operation to be performed by inserting a leading edge portion of the selected substrate between the first and second supply substrates and thereafter grasping the frame with one hand and pulling lead end portions of the first and second supply substrates with the other hand so as to advance the first and second supply substrates and the selected substrate through the substrate processing assembly for application of pressure by the resiliently deformable structure.

11. A hand-held substrate processing apparatus according to claim 10, wherein the cartridge assembly is configured to support the substrate processing assembly therein.

12. A hand-held substrate processing apparatus according to claim 10, wherein the cartridge assembly is mounted in the frame.

13. A hand-held A substrate processing apparatus according to claim 10, wherein the first and second supply rolls are individually rotatably mounted in the cartridge assembly.

14. A hand-held substrate processing apparatus according to claim 10, wherein the first and second supply rolls are removably rotatably mounted in the cartridge assembly.

15. A hand-held A substrate processing apparatus according to claim 10, wherein the first supply substrate is a release liner and wherein the second supply substrate is a transparent laminating film having a layer of adhesive disposed on the first surface thereof for use in a combination laminating/adhesive transfer operation.

16. A hand-held substrate processing apparatus according to claim 10, wherein the first supply substrate is a flexible magnet substrate and wherein the second supply substrate is a mask substrate devoid of adhesive while wound on the second supply roll for use in a magnet making operation.

17. A hand-held substrate processing apparatus according to claim 10, wherein the first supply substrate is a release liner and wherein the second supply substrate is a laminating film devoid of adhesive for use in an adhesive transfer operation.

18. A hand-held substrate processing apparatus according to claim 10, wherein the first and second supply substrates are transparent laminating films for use in a laminating operation.

* * * * *